(12) United States Patent
Nonaka

(10) Patent No.: US 6,978,320 B2
(45) Date of Patent: Dec. 20, 2005

(54) MULTIFUNCTIONAL INPUT DEVICE FOR CENTRALIZED CONTROL OF PLURALITY OF ACTUATOR DRIVE CHARACTERISTICS HAVE FUNCTION FEEL LIBRARY

(75) Inventor: Kaiji Nonaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 211 days.

(21) Appl. No.: 10/195,224

(22) Filed: Jul. 15, 2002

(65) Prior Publication Data

US 2003/0018835 A1 Jan. 23, 2003

(30) Foreign Application Priority Data

Jul. 17, 2001 (JP) ....................... 2001-217020

(51) Int. Cl.[7] .............................................. G06F 3/00
(52) U.S. Cl. .............................. 710/5; 710/14; 710/38; 710/15; 710/16; 345/156
(58) Field of Search ................. 710/5, 14, 38, 710/15, 16; 345/156

(56) References Cited

U.S. PATENT DOCUMENTS 6,050,718 A * 4/2000 Schena et al. ............... 700/85
6,437,771 B1 * 8/2002 Rosenberg et al. .......... 345/156

* cited by examiner

*Primary Examiner*—Tammara Peyton
(74) *Attorney, Agent, or Firm*—Brinks Hofer Gilson & Lione

(57) ABSTRACT

The multifunctional input device is configured of an operating unit; a first detector and a second detector for detecting an operating state of the operating unit; an actuator for providing an external force to the operating unit; a controller for exchanging signals with a host computer, which controls a plurality of electrical apparatuses, and controlling driving of the actuator in accordance with instructions from the host computer; and a function/feel library in which are stored actuator driving data matching first detection signals and second detection signals supplied from the first detector and the second detector, and data for manipulating the electrical apparatuses by way of the host computer. In the function/feel library are stored a plurality of actuator drive characteristics, feel number information including numbers identifying combinations of actuator drive characteristics and detection signals, and function number information including numbers identifying the first detection signals supplied from the first detector and the second detection signals supplied from the second detector.

38 Claims, 6 Drawing Sheets

FIG. 3

| DENOMINATION | REACTIVE FORCE CHARACTERISTIC | INPUT SIGNAL | | OUTPUT SIGNAL | |
|---|---|---|---|---|---|
| | | APPARATUS NUMBER | POSITION DESIGNATION | HAPTIC POSITION NUMBER | TACT SWITCH |
| 15°-STEP 5-POSITION ROTARY SWITCH | Reactive force vs angle of rotation, −30° −15° 0° 15° 30° | 1 | −2(−30°)<br>−1(−15°)<br>0(0°)<br>+1(+15°)<br>+2(+30°) | −2(>−22.5°)<br>−1(>−22.5°,<−7.5°)<br>0(>−7.5°,<+7.5°)<br>+1(>+7.5°,<+22.5°)<br>+2(>+22.5°) | 0: SW OFF<br>1: SW1 ON<br>2: SW2 ON |
| 15°-STEP 13-POSITION ROTARY SWITCH | Reactive force vs angle of rotation, −90° 0° 90° | 2 | n= : −7,−6<br>, , 0, , ,<br>, +7 :<br>(15n°) | n : (15n° −7.5°<br><=n<15n° +7.5°) | |
| 15°-STEP 3-POSITION ROTARY SWITCH | Reactive force vs angle of rotation, −15° 0° 15° | 3 | n= : −1, 0, +1 | n : (15n° −7.5°<br><=n<15n° +7.6°) | |
| 30°-STEP 2-POSITION ROTARY SWITCH WITH CENTER-RETURNING CAPABILITY | Reactive force vs angle of rotation, −30° 0° 30° | 4 | n= : −1, +1 | −1 : (<=0)<br>+1 (>0) | |
| 30°-STEP 4-POSITION ROTARY SWITCH | Reactive force vs angle of rotation, −45° −15° 15° 45° | 5 | n= : −2, −1,<br>+1, +2 | n : (15n° −7.5°<br><=n<15n° +7.6°) | |
| 180° VARIABLE RESISTOR | Reactive force vs angle of rotation, −90° 0° 90° | 6 | n% (= :<br>180°n−90°) | n% =<br>(100°/180° +50%) | |

FIG. 4

| STATE OF VEHICLE | STATE OF CENTRALLY CONTROLLED APPARATUS | STATE OF THIS APPARATUS | INPUT | | OUTPUT | |
|---|---|---|---|---|---|---|
| | | | APPARATUS NUMBER | POSITION | POSITION | STATE |
| ENGINE STARTED; INITIALIZATION | THIS APPARATUS IS REQUESTED TO SET CURRENT POSITION OF 5-POSITION SELECTOR SWITCH TO POSITION 3; POSITION SELECTION SIGNAL FROM THIS APPARATUS IS AWAITED. | BROUGHT TO HALT AS CENTER POSITION OF 15°-STEP 5-POSITION ROTARY SWITCH. | 1 ... | 0 ... | ... ... | ... 0 |
| EQUIPMENT ITEM SELECTED | NAVIGATION, AIR CONDITIONER, MOBILE TELEPHONE E-MAIL SYSTEM, AM/FM TUNER, CD/MD PLAYER OR AUDIO AMPLIFIER ACCORDING TO OUTPUT OF THIS APPARATUS. | REQUIRED REACTIVE FORCE IS GENERATED ACCORDING TO ROTARY ACTION BY OPERATOR, AND SWITCH POSITION INFORMATION IS SUPPLIED. | ... | ... | −2 ≀ +2 | 0 |
| AIR CONDITIONER SETTING | AIR CONDITIONER IS ACCESSED. THIS APPARATUS IS REQUESTED TO SET CURRENT POSITION OF 5-POSITION SELECTOR SWITCH TO POSITION 3; POSITION SELECTION SIGNAL FROM THIS APPARATUS IS AWAITED. REC/FRESH, AC ON/OFF, TEMP CONTROL, FAN SPEED OR DEFROSTER IS DISPLAYED ACCORDING TO OUTPUT OF THIS APPARATUS. | OPERATOR CLOSES FIRST STAGE OF TACT SWITCH IN POSITION 2. BROUGHT TO HALT AS POSITION 3 OF 15°-STEP 5-POSITION ROTARY SWITCH. REQUIRED REACTIVE FORCE IS GENERATED ACCORDING TO ROTARY ACTION BY OPERATOR, AND SWITCH POSITION INFORMATION IS SUPPLIED. | ... 1 ... ... | ... 0 ... ... | −1 ... −2 ≀ +2 | 1 0 0 |
| TEMPERATURE SETTING | TEMP CONTROL ACCESSED; CURRENT TEMPERATURE 22°C IS READ. THIS APPARATUS IS REQUESTED TO SET CURRENT POSITION OF 13-POSITION SELECTOR SWITCH TO POSITION 7; POSITION SELECTION SIGNAL FROM THIS APPARATUS. SET TEMPERATURE ACCORDING TO OUTPUT OF THIS APPARATUS. SET ROOM TEMPERATURE FROM 16°C TO 27°C AT 1°C INTERVALS. AIR CONDITIONER ACCESSED. TEMPERATURE IS SET TO 19°C MATCHING POSITION 4. | OPERATOR CLOSES FIRST STAGE OF TACT SWITCH IN POSITION 3. BROUGHT TO HALT AS POSITION 6 OF 7.5°-STEP 13-POSITION ROTARY SWITCH. REQUIRED REACTIVE FORCE IS GENERATED ACCORDING TO ROTARY ACTION BY OPERATOR, AND SWITCH POSITION INFORMATION IS SUPPLIED. OPERATOR CLOSES FIRST STAGE OF TACT SWITCH IN POSITION 4. | ... ... 2 ... ... 2 | ... ... 0 ... ... ... | −2 ... ... +4 +4 ... | 1 1 ... 0 1 ... |
| INITIALIZATION | | OPERATOR CLOSES FIRST AND SECOND STAGES OF TACT SWITCH. | ... | ... | ... | 2 |

FIG. 5

| State | Description | Action / Reactive Force | | | | |
|---|---|---|---|---|---|---|
| INITIALIZATION | SYSTEM IS RETURNED TO INITIAL STATE, AND THIS APPARATUS IS REQUESTED TO SET CURRENT POSITION OF 5-POSITION SELECTOR SWITCH TO POSITION 3; POSITION SELECTION SIGNAL FROM THIS APPARATUS IS AWAITED. | | ... | ... | ... | 0 |
| | | | 1 | 0 | ... | ... |
| EQUIPMENT ITEM SELECTED | NAVIGATION, AIR CONDITIONER, MOBILE TELEPHONE E-MAIL SYSTEM, AM/FM TUNER, CD/MD PLAYER OR AUDIO AMPLIFIER ACCORDING TO OUTPUT OF THIS APPARATUS. | BROUGHT TO HALT AS CENTER POSITION OF 15°-STEP 5-POSITION ROTARY SWITCH. REQUIRED REACTIVE FORCE IS GENERATED ACCORDING TO ROTARY ACTION BY OPERATOR, AND SWITCH POSITION INFORMATION IS SUPPLIED. | ... | ... | 0 | 0 |
| | | | ... | ... | −2 ≀ +2 | 0 |
| AUDIO SETTING | AM/FM TUNER IS ACCESSED. THIS APPARATUS IS REQUESTED TO SET CURRENT POSITION OF 3-POSITION SELECTOR SWITCH TO POSITION 2; POSITION SELECTION SIGNAL FROM THIS APPARATUS IS AWAITED.  AM SEARCH, PRESET CHANNEL TUNING OR FM SEARCH IS DISPLAYED ACCORDING TO OUTPUT OF THIS APPARATUS. | OPERATOR CLOSES FIRST STAGE OF TACT SWITCH IN POSITION 4.  BROUGHT TO HALT AS CENTER POSITION OF 15°-STEP 3-POSITION ROTARY SWITCH. REQUIRED REACTIVE FORCE IS GENERATED ACCORDING TO ROTARY ACTION BY OPERATOR, AND SWITCH POSITION INFORMATION IS SUPPLIED. | ... | ... | −2 | 1 |
| | | | 3 | 0 | ... | ... |
| | | | ... | ... | 0 | 2 |
| | | | ... | ... | −1 ≀ +1 | 0 |
| FM SEARCH | FM TUNER IS ACCESSED. THIS APPARATUS IS REQUESTED TO SET CURRENT POSITION OF 30°-STEP 2-POSITION ROTARY SWITCH WITH CENTER-RETURNING CAPABILITY TO NEUTRAL POINT; POSITION SELECTION SIGNAL FROM THIS APPARATUS IS AWAITED.  CHANNEL SEARCH IS EXECUTED DOWNWARD OR UPWARD IN FREQUENCY ACCORDING TO LEFTWARD OR RIGHTWARD ROTARY ACTION BY OPERATOR. SEARCH IS ONCE SUSPENDED WHEN BROADCAST IS RECEIVED. THIS APPARATUS IS REQUESTED TO SET CURRENT POSITION TO NEUTRAL POINT IMMEDIATELY. | OPERATOR CLOSES FIRST STAGE OF TACT SWITCH IN POSITION 3.  REQUIRED REACTIVE FORCE IS GENERATED ACCORDING TO LEFTWARD OR RIGHTWARD ROTARY ACTION BY OPERATOR, AND SWITCH POSITION INFORMATION IS SUPPLIED. | ... | ... | +1 | 0 |
| | | | 4 | 0 | ... | ... |
| | | | ... | ... | −1 ≀ +1 | 0 |
| | | | ... | ... | ... | 0 |
| | | | 4 | ... | ... | ... |
| INITIALIZATION | | OPERATOR CLOSES FIRST AND SECOND STAGES OF TACT SWITCH. | ... | ... | ... | 2 |

FIG. 6

| | | | | | | |
|---|---|---|---|---|---|---|
| INITIALIZATION | SYSTEM IS RETURNED TO INITIAL STATE, AND THIS APPARATUS IS REQUESTED TO SET CURRENT POSITION OF 5-POSITION SELECTOR SWITCH TO POSITION 3; POSITION SELECTION SIGNAL FROM THIS APPARATUS IS AWAITED. | | ... | ... | ... | 0 |
| | | | 1 | 0 | ... | ... |
| EQUIPMENT ITEM SELECTED | NAVIGATION, AIR CONDITIONER, MOBILE TELEPHONE E-MAIL SYSTEM, AM/FM TUNER, CD/MD PLAYER OR AUDIO AMPLIFIER ACCORDING TO OUTPUT OF THIS APPARATUS. | BROUGHT TO HALT AS CENTER POSITION OF 15°-STEP 5-POSITION ROTARY SWITCH. REQUIRED REACTIVE FORCE IS GENERATED ACCORDING TO ROTARY ACTION BY OPERATOR, AND SWITCH POSITION INFORMATION IS SUPPLIED. | ... | ... | 0 | 0 |
| | | | ... | ... | -2 ≀ +2 | 0 |
| AUDIO AMPLIFIER SELECTION | AUDIO AMPLIFIER IS ACCESSED. THIS APPARATUS IS REQUESTED TO SET CURRENT POSITION OF 4-POSITION SELECTOR SWITCH TO POSITION 2; POSITION SELECTION SIGNAL FROM THIS APPARATUS IS AWAITED.<br><br>VOLUME, BASS, TREBLE OR FADER IS DISPLAYED ACCORDING TO OUTPUT OF THIS APPARATUS. | OPERATOR CLOSES FIRST STAGE OF TACT SWITCH IN POSITION 5.<br><br>↓<br><br>REQUIRED REACTIVE FORCE IS GENERATED ACCORDING TO ROTARY ACTION BY OPERATOR IN FIRST POSITION OF 30°-STEP 4-POSITION ROTARY SWITCH, AND SWITCH POSITION INFORMATION IS SUPPLIED. | ... | ... | +2 | 1 |
| | | | 5 | 1 | ... | ... |
| | | | ... | ... | -2 ≀ +2 | 1 |
| | | | ... | ... | | 0 |
| VOLUME CONTROL SELECTED | VOLUME CONTROL IS ACCESSED, AND VOLUME SETPOINT 20% IS ACQUIRED. THIS APPARATUS IS REQUESTED TO SET CURRENT POSITION OF 180° VARIABLE RESISTOR TO 20%. POSITION SELECTION SIGNAL FROM THIS APPARATUS IS AWAITED.<br><br>VOLUME SETTING IS CHANGED ON REAL TIME BASIS ACCORDING TO OUTPUT OF THIS APPARATUS. | OPERATOR CLOSES FIRST STAGE OF TACT SWITCH IN POSITION 1.<br><br>BROUGHT TO HALT AS CURRENT POSITION OF 180° VARIABLE RESISTOR TO 20%. PRESCRIBED VISCOUS RESISTANCE IS GENERATED ACCORDING TO ROTARY ACTION BY OPERATOR, AND SWITCH POSITION INFORMATION IS SUPPLIED. | ... | ... | -2 | 1 |
| | | | 6 | 20 | ... | ... |
| | | | ... | ... | 20<br>0~100 | 0 |
| | | | ... | ... | 25 | 1 |
| INITIALIZATION | SYSTEM IS RETURNED TO INITIAL STATE, AND THIS APPARATUS IS REQUESTED TO SET CURRENT POSITION OF 5-POSITION SELECTOR SWITCH TO POSITION 3; POSITION SELECTION SIGNAL FROM THIS APPARATUS IS AWAITED. | OPERATOR CLOSES FIRST AND SECOND STAGES OF TACT SWITCH.<br><br>↓ | ... | ... | ... | 2 |
| | | | 1 | 3 | ... | ... |

MULTIFUNCTIONAL INPUT DEVICE FOR CENTRALIZED CONTROL OF PLURALITY OF ACTUATOR DRIVE CHARACTERISTICS HAVE FUNCTION FEEL LIBRARY

This application claims the benefit of priority to Japanese Patent Application 2001-217020, filed Jul. 17, 2001.

BACKGROUND OF THE INVENTION

1. Field of the Invention

The present invention relates to a multifunctional input device for centralized control of one or more external electrical apparatuses and a plurality of regulable functions incidental thereto, and more particularly to a signal transmission system between the multifunctional input device and a host computer or some other part for controlling the electrical apparatuses and a drive system for an actuator which provides a required feel to the manipulation of an operating unit.

2. Description of the Prior Art

According to the prior art, there are already proposed techniques for centralized control of various electrical apparatuses including, for instance, an air conditioner, AM/FM tuner, CD/MD player, audio amplifier and navigation system by using one or a few multifunctional input devices.

FIG. 7 illustrates an example of known multifunctional input device of this kind. As is evident from this drawing, this example of multifunctional input device comprises an operating unit 101, a detector 102 for detecting the operating state of the operating unit 101, an actuator 103 for providing an external force to the operating unit 101, and a controller 106 for exchanging signals with a host computer 105 centrally controlling a plurality of electrical apparatuses 104a through 104n and controlling the driving of the actuator 103 in accordance with instructions from the host computer 105. The host computer 105 is supplemented with a display unit 107 and a memory 108, and in the memory 108 are stored a drive signal c for the actuator 103 matching a detection signal a transmitted from the controller 106 and a display signal b for the display unit 107 and manipulation signals d1 through dn for the electrical apparatuses 104a through 104n matching the detection signal a and the display signal b.

When the operating unit 101 is manipulated, the controller 106 transmits the detection signal a supplied from the detector 102 to the host computer 105. The host computer 105, according to the detection signal a transmitted from the detector 102 and the display signal b for the display unit 107 stored in the memory 108, reads the matching drive signal c for the actuator 103 from the memory 108, and transmits it to the controller 106. The controller 106 drives the actuator 103 in accordance with the drive signal c transmitted from the host computer 105. The host computer 105, according to the detection signal a transmitted from the detector 102 and the display signal b for the display unit 107, reads out the matching one of the manipulation signals d1 through dn of the electrical apparatuses 104a through 104n stored in the memory 108, and transmits it the required one of the electrical apparatuses 104a through 104n. The required electrical apparatus undergoes regulation of the function indicated by the detection signal a on the basis of the one transmitted from the host computer 105 out of the manipulation signals d1 through dn.

Since this example of multifunctional input device can centrally control the plurality of the electrical apparatuses 104a through 104n by manipulating a single multifunctional input device, the desired functional regulation of the desired one of the electrical apparatuses 104a through 104n can be more easily accomplished than when the electrical apparatuses 104a through 104n are individually manipulated. Furthermore, as this example of multifunctional input device drives the actuator 103 by transmitting a drive signal c matching the detection signal a and the display signal b from the host computer 105 to the controller 106, a feel matching the function to be regulated of the electrical apparatuses 104a through 104n can be provided to the operating unit 101, and each of different electrical apparatuses can be functionally regulated easily and with a good feel.

However, this example of multifunctional input device according to the prior art, as it transmits, from the controller 106 to the host computer 105, the detection signal A supplied from the detector 102 and, from the host computer 105 to the controller 106, the drive signal c for the actuator 103, there is a disadvantage that the multifunctional input device by itself cannot regulate the functions of the electrical apparatuses 104a through 104n in a self-conclusive way and, because a large volume of signals are transmitted and received between the controller 106 and the host computer 105, there further is a cumbersome problem of a heavy load on the host computer 105, making it difficult to regulate the functions of the plurality of the electrical apparatuses 104a through 104n with high efficiency. These disadvantages become even more conspicuous as the number of the electrical apparatuses 104a through 104n and that of their functions to be regulated using the multifunctional input device increase.

SUMMARY OF THE INVENTION

An object of the present invention, intended to obviate these shortcomings of the prior art, is to provide a multifunctional input device capable of alleviating the load on the host computer and permitting ready and high speed regulation of the various functions of a plurality of electrical apparatuses.

In order to solve the problems noted above, according to a first aspect of the invention, there is provided a configuration having an operating unit, a detector for detecting an operating state of the operating unit, an actuator for providing an external force to the operating unit, and a first controller for exchanging signals with a second controller, which controls one or more external electrical apparatuses, and controlling driving of the actuator in accordance with instructions from the second controller, wherein the first controller is provided with a function/feel library in which is stored a relation of a plurality of actuator drive characteristics representing variations in an actuator drive signal matching detection signals supplied from the detector, feel number information including numbers specifying combinations of the actuator drive characteristics and the detection signals, and function number information including numbers specifying the detection signals; and the first controller, when it has received the feel number information supplied from the second controller, reads out the actuator drive signal matching feel number information received from the function/feel library to control the driving of the actuator or, when the operating unit is manipulated, reads out the function number information matching the detection signal from the function/feel library and transmits it to the second controller to selectively control one or more of the external electrical apparatuses via the second controller.

By providing the multifunctional input device with the function/feel library as described above, the load on the second controller can be alleviated because the self-conclusiveness of the multifunctional input device can be enhanced as compared with a configuration in which the second controller is provided with a memory for storing the function/feel library. In addition, as the configuration in which feel number information and function number information are transmitted and received between the first controller and the second controller can help reduce the volume of signals transmitted and received between the first controller and the second controller as compared with a configuration in which the detection signal a and drive signal c are transmitted and received, the load on the second controller can be further alleviated. Therefore, for these reasons, the functional regulation of electrical apparatuses can be facilitated and increased in speed, or the number of functions of electrical apparatuses regulable by a single multifunctional input device can be increased.

According to a second aspect of the invention, there is provided a configuration wherein the operating unit is manipulable in multiple directions, and a plurality of kinds of detection signals are supplied from the detector according to a manipulated direction of the operating unit.

By providing an operating unit which is manipulable in multiple directions and supplying a plurality of kinds of detection signals from the detector according to the manipulated direction of the operating unit, the operating unit can be consolidated more intensely than where a single multifunctional input device is provided with a plurality of operating units, making it possible to make the multifunctional input device more compact in size and more multifunctional and therefore resulting in improved manipulability.

According to a third aspect of the invention, there is provided a configuration wherein the actuator drive characteristics are manipulative feels that are sensed when a multiple-position changeable rotary switch, a multiple position changeable rotary switch with a center-returning capability, an encoder with multiple detents or a variable resistor is manually operated.

As means for functionally regulating electrical apparatuses, these switches, encoders or variable resistors are used. Therefore, where the actuator drive characteristics stored in the function/feel library of the multifunctional input device are manipulative feels that are sensed when these means of functional regulating means are manually operated, the user can sense the same manipulative feel when he or she manipulates the operating unit as what is sensed when one or another of these means of functional regulating means is manipulated, resulting in improved manipulability of the multifunctional input device.

BRIEF DESCRIPTION OF THE DRAWINGS

FIG. 3 is a tabulated diagram illustrating the configuration of a function/feel library in this mode of implementing the invention.

FIG. 4 is a flowchart showing the temperature regulating procedure for an air conditioner using the multifunctional input device in this mode of implementing the invention.

FIG. 5 is a flowchart showing the FM channel selection procedure using the multifunctional input device in this mode of implementing the invention.

FIG. 6 is a flowchart showing the audio volume regulating procedure using the multifunctional input device in this mode of implementing the invention.

DESCRIPTION OF THE PREFERRED EMBODIMENT

Figure 1:
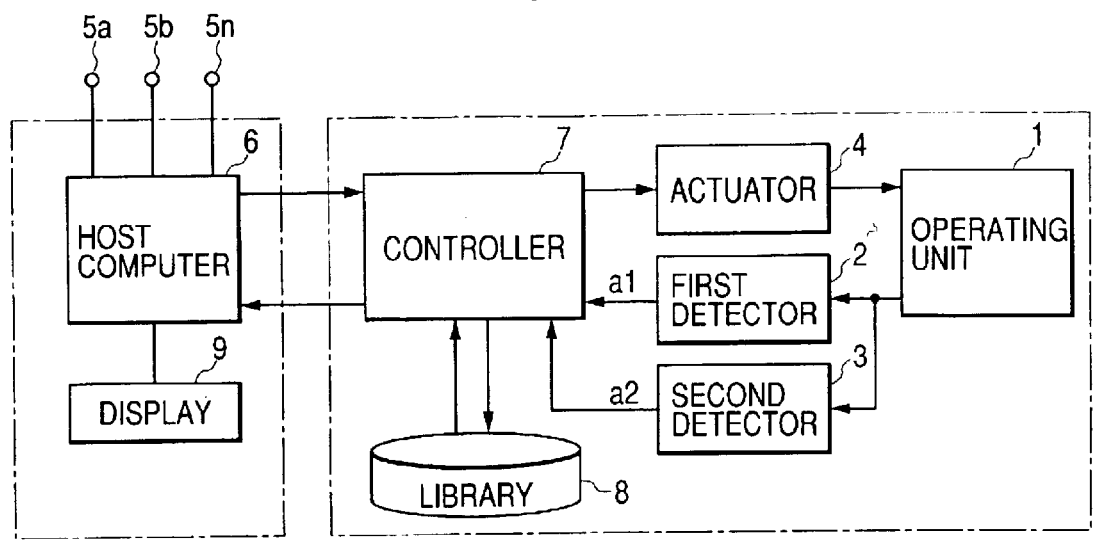
FIG. 1 illustrates the configuration of a multifunctional input device in one mode of implementing the present invention.
Figure 2:
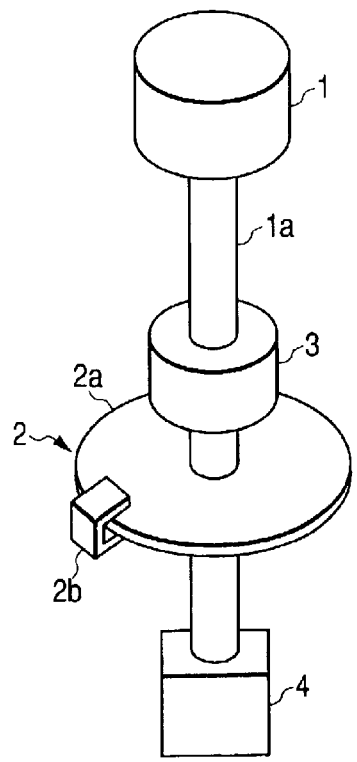
FIG. 2 illustrates the configuration of an operating unit, a detector and an actuator in this mode of implementing the invention.
Figure 7:
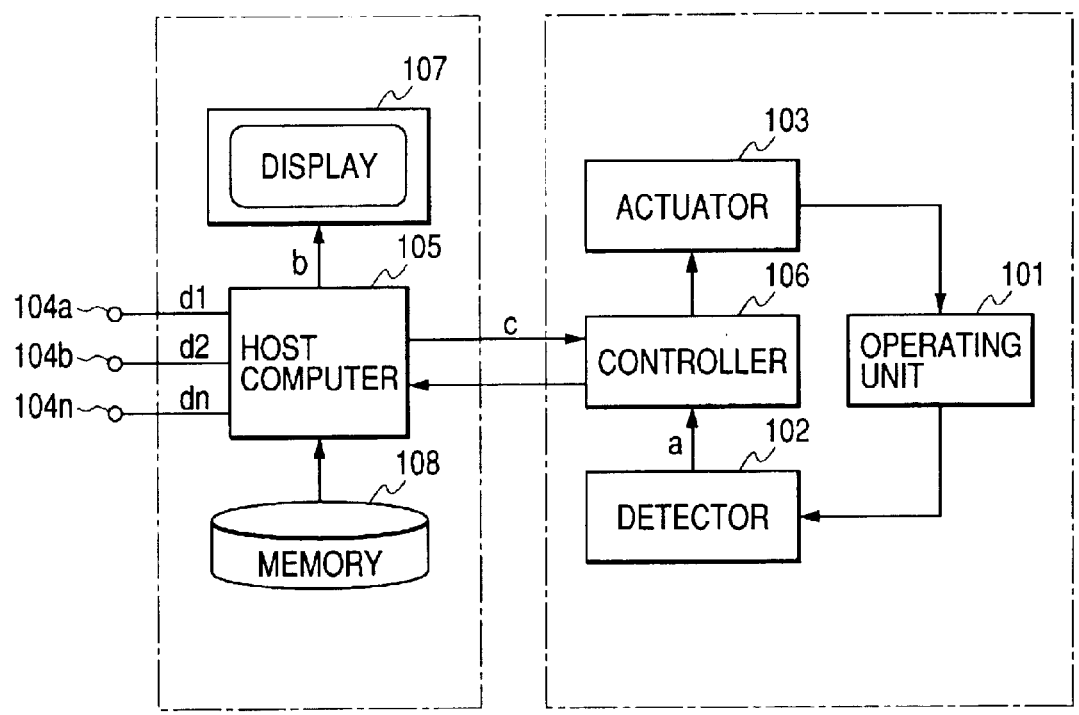
FIG. 7 illustrates an example of multifunctional input device according to the prior art.

An example of multifunctional input device according to the present invention will be described below with reference to FIG. 1 through FIG. 3. FIG. 1 illustrates the configuration of a multifunctional input device in one mode of implementing the invention; FIG. 2 illustrates the configuration of an operating unit, a detector and an actuator in this mode of implementing the invention; and FIG. 3 is a tabulated diagram illustrating the configuration of a function/feel library in this mode of implementing the invention.

As shown in FIG. 1, this example of multifunctional input device is configured of an operating unit 1; a first detector 2 and a second detector 3 for detecting the operating state of the operating unit 1; an actuator 4 for providing an external force to the operating unit 1; a controller 7, which is a first controller, for exchanging signals with a host computer 6, which is a second controller, for centrally controlling a plurality of electrical apparatuses 5a through 5n and controlling the driving of the actuator 4 in accordance with instructions from the host computer 6, and a function/feel library 8 in which are stored data for driving the actuator 4 matching a first detection signal a1 and a second detection signal a2 supplied from the first detector 2 and the second detector 3 and data for manipulating the electrical apparatuses 5a through 5n via the host computer 6. The host computer 6 can be augmented with a display unit 9.

As shown in FIG. 2, the operating unit 1, fitted to the operation axis 1a of the first detector 2 and the second detector 3, is so arranged as to rotate the first detector 2 via the operation axis 1a and to push the second detector 3. As the first detector 2 can be used a rotary type positional signal detector, such as a rotary encoder or a rotary type variable resistor. As the second detector 3 can be used a pushing type switch, such as a double action tact switch. The example illustrated in FIG. 2 uses as the first detector 2 a rotary encoder consisting of a code plate 2a and a sensor 2b for detecting a code formed on the code plate 2a.

Further as shown in FIG. 2, the actuator 4, fitted to a tip of the operation axis 1a, provides an external force to the operating unit 1 via the operation axis 1a, and thereby enables the user to sense the required feel of manipulation. As the actuator 4 can be used a rotary motor, linear motor, solenoid or the like.

As the electrical apparatuses 5a through 5n, any desired electrical apparatuses commonly known can be connected. Where this example of multifunctional input device is to be used as a centralized control system for vehicle-mounted electrical apparatuses, an air conditioner, AM/FM tuner, CD/MD player, audio amplifier and navigation system, for instance, are connected.

In the function/feel library 8 are stored, as shown in FIG. 3, a plurality of actuator drive characteristics (reactive force characteristics) 11 indicating variations of the actuator drive signal (reactive force) matching the detection signal a1 supplied from the first detector 2, feel number information (input signal) 12 consisting of reference numbers specifying the combination of the actuator drive characteristics 11 and the detection signals a1, and function number information (output signal) 13 consisting of the reference numbers specifying the combination of the detection signal a1 supplied from the first detector 2 and the detection signals a2 supplied from the second detector 3.

The feel number information 12 consists of apparatus numbers (apparatus signals) 12a, of which one is assigned to each of the plurality of actuator drive characteristics 11 and position designation numbers 12b, of which one is assigned to each of the operating positions of the operating unit 1 in the actuator drive characteristics 11, while the function number information 13 consists of haptic position numbers 13a, of which one is assigned to each of the operating ranges of the operating unit 1 and tact switch numbers 13b, of which one is assigned to each of the operating states of the second detector 3 in the actuator drive characteristics 11.

Apparatus number "1" provides the operating unit 1 with the feel that is sensed when a 15°-step 5-position rotary switch is manipulated. Every time the operating unit 1 is turned by 15 degrees clockwise or counterclockwise around center position 0°, a peak-like actuator drive signal is given to the operating unit 1. Regarding the actuator drive characteristics represented by this apparatus number "1", position designation numbers "−2", "−1", "0", "+1" and "+2" are assigned to the respective operating positions −30°, −15°, 0°, +15° and +30° of the operating unit 1 around the center position 0°. Also, haptic position numbers "−2", "−1", "0", "+1" and "+2" are assigned to the respective operating ranges $-30°≦\theta<-22.5°$, $-22.5°≦\theta<-7.5°$, $-7.5°≦\theta<+7.5°$, $+7.5°≦\theta<+22.5°$ and $+22.5°≦\theta<+30°$ of the operating unit 1 around the center position 0°.

Apparatus number "2" provides the operating unit 1 with the feel that is sensed when the 15°-step 13-position rotary switch is manipulated. Every time the operating unit 1 is turned by 15 degrees clockwise or counterclockwise around center position 0°, a peak-like actuator drive signal is given to the operating unit 1. Regarding the actuator drive characteristics represented by this apparatus number apparatus number "2", position designation numbers "−6", "−5", "−4", "−3", "−2", "−1", "0", "+1", "+2", "+3", "+4", "+5", and "+6" are assigned to the respective operating positions −90°, −75°, −60°, −45°, −30°, −15°, 0°, +15°, +30°, +45°, +60°, +75° and +90° of the operating unit 1 around the center position 0°. Also, haptic position numbers "−6", "−5", "−4", "−3", "−2", "−1", "0", "+1", "+2", "+3", "+4", "+5" and "+6" are assigned to the respective operating ranges $-90°≦\theta<-82.5°$, $-82.5°≦\theta<-67.5°$, $-67.5°≦\theta<-52.5°$, $-52.5°≦\theta<-37.5$, $-37.5°≦\theta<-22.5°$, $-22.5°≦\theta<,-7.5-7.5≦\theta<+7.5$, $+7.5≦\theta<+22.5$, $+22.5°≦\theta<+37.5°$, $+37.5°≦\theta<+52.5°$, $+52.5°≦\theta<+67.5"$, $+67.5°≦\theta<+82.5°$, $+82.5°≦\theta<+90°$ of the operating unit 1 around the center position 0°.

Apparatus number "3" provides the operating unit 1 with the feel that is sensed when a 15°-step 3-position rotary switch is manipulated. Every time the operating unit 1 is turned by 15 degrees clockwise or counterclockwise around the center position 0°, a peak-like actuator drive signal is given to the operating unit 1. Regarding the actuator drive characteristics represented by this apparatus number apparatus number "3", position designation numbers "−1", "0" and "+1" are assigned to the respective operating positions −15°, 0° and +15° of the operating unit 1 around the center position 0°. Also, haptic position numbers "−1", "0" and "+1, are assigned to the respective operating ranges $-15°≦\theta<-7.5°$, $-7.5°≦\theta<+7.5°$ and $+7.5°≦\theta<+15°$ of the operating unit 1 around the center position 0°.

Apparatus number "4" provides the operating unit 1 with the feel that is sensed when a 30°-step 2-position rotary switch with center-returning capability is manipulated. Every time the operating unit 1 is turned by 30 degrees clockwise or counterclockwise around the center position 0°, a peak-like actuator drive signal is given to the operating unit 1. Regarding the actuator drive characteristics represented by this apparatus number "4", position designation numbers "−1" and "+1" are assigned to the respectively clockwise and counterclockwise operating positions of the operating unit 1 around the center position 0°. Also, haptic position numbers "−1 and "+1, are assigned to the respective operating ranges $-30°≦\theta<0°$, $0°≦\theta<+30°$ of the operating unit 1 around the center position 0°.

Apparatus number "5" provides the operating unit 1 with the feel that is sensed when a 30"-step 4-position rotary switch is manipulated. Every time the operating unit 1 is turned by 15 degrees clockwise or counterclockwise beyond the center position 0°, a peak-like actuator drive signal is given to the operating unit 1. Regarding the actuator drive characteristics represented by this apparatus number "5", position designation numbers "−2", "−1", "+1" and ""2" are assigned to the respective operating positions −45°, −15°, +15° and +45° of the operating unit 1 around the center position "0". Also, haptic position number "−2", "−1", "+1" and "+2" are assigned to the respective operating ranges $-45°≦\theta<-30°$, $-30°≦\theta<0°$, $0°≦\theta<+30°$, $+30°≦\theta<+45°$ of the operating unit 1 around the center position 0°.

Apparatus number "6" provides the operating unit 1 with the feel that is sensed when a 180° variable resistor is manipulated. Every time the operating unit 1 is turned by 90 degrees clockwise or counterclockwise around the center position 0°, an actuator drive signal in an oscillating mode of a fixed level is given to the operating unit 1. Regarding the actuator drive characteristics represented by this apparatus number "6", a rotation ratio of n % of the operating unit 1 is assigned as a position designation number n relative to the rotation ratio of 100% representing the rotation of the operating unit 1 from the center position 0° to either −90° or +90". Similarly, the rotation ratio n % of the operating unit 1 is assigned as a haptic position number n of the operating unit 1 relative to the rotation ratio of 100% representing the rotation of the operating unit 1 from the center position 0° to either −90° or +90°.

Tact switch number nor indicates that both first and second switches provided on a double action tact switch constituting the second detector 3 are off. Tact switch number "1" indicates that the first switch provided on the double action tact switch constituting the second detector 3 has been selectively changed over to an ON state, while tact switch number "2" indicates that the second switch provided on the double action tact switch constituting the second detector 3 has been selectively changed over to an ON state.

The procedure of temperature regulation of an air conditioner using the multifunctional input device in this mode of implementing the invention will be described below with reference to FIG. 4.

First, when the engine of the vehicle is started, the host computer 6, after transmitting apparatus number "1" and position designation number "0" to the controller 7, waits for reception from the controller 7. The controller 7 reads an actuator drive signal matching apparatus number "1" and position designation number "0" out of the function/feel library 8, drives the actuator 4 in accordance with the actuator drive signal, and sets the operating unit 1 in the center position. This causes the operating unit 1 to function as the 15°-step 5-position rotary switch until another apparatus number is transmitted from the host computer 6. Then, the controller 7 reads haptic position number "0" matching position designation number "0" out of the function/feel library 8, and sends it to the host computer 6 together with tact switch number "0", which indicates that the second detector 3 is off. This results in initialization of the electrical apparatuses 5a through 5n to which the host computer 6 is connected as far as their functions are concerned, and enables the electrical apparatuses 5a through 5n connected to the host computer 6 to be functionally regulated.

When the user turns the operating unit 1 in this state, the first detection signal a1 matching the rotation degree of the operating unit 1 is supplied from the first detector 2. The controller 7 reads actuator drive characteristics 11 matching apparatus number "1" out of the function/feel library 8, and drives the actuator 4 in accordance with an actuator drive signal matching the first detection signal a1 supplied from the first detector 2. As described above, apparatus number "1" provides the operating unit 1 with the feel that is sensed when the 15°-step 5-position rotary switch is manipulated. Every time the operating unit 1 is rotated by 15 degrees either clockwise or counterclockwise around the center position 0°, a click feel is provided to the operating unit 1. Also the controller 7, as a click feel is provided to the operating unit 1, successively alters the haptic position number from "0 " to "−1" and "−2" or to "+1" and "+2" and transmits these numbers to the host computer 6.

In the host computer 6 are stored the types of electrical apparatuses having one-to-one correspondence to the haptic position numbers. It is supposed that a navigation system, air conditioner, AM/FM tuner, CD/MD player and audio amplifier, for instance, are stored in this embodiment respectively matching haptic position numbers "0", "−1", "−2", "+1" and "+2". In this instance, when the user turns the operating unit 1 counterclockwise to a position where a click feel is sensed only once, the host computer 6 receives haptic position number "−1" transmitted from the controller 7, and selects the air conditioner out of the electrical apparatuses 5a through 5n connected to the host computer 6. Then, as the user presses the double action tact switch, which is the second detector 3, just once, the first switch constituting part of the double action tact switch is selectively turned on to supply the second detection signal a2, and tact switch number is altered from "0" to "1". The controller 7 transmits the altered tact switch number "1" to the host computer 6 which, upon receiving this number, finalizes its control mode for "air conditioner" and displays the air conditioner on the display unit 9.

After that, the host computer 6 again transmits apparatus number "1" and position designation number "0" to the controller 7, and waits for reception from the controller 7. The controller 7, reading apparatus number "1" and an actuator drive signal matching position designation number "0" out of the function/feel library 8, drives the actuator 4 in accordance with the actuator drive signal to return the operating unit 1 to the center position.

When the user turns the operating unit 1 in this state, as in the foregoing case, the first detection signal a1 matching the rotation degree of the operating unit 1 is supplied from the first detector 2, and the controller 7 drives the actuator 4 in accordance with an actuator drive signal matching the first detection signal a1. Also the controller 7, as a click feel is provided to the operating unit 1, successively alters the haptic position number from "0" to "−1" and "−2" or to "+1" and "+2" and transmits these numbers to the host computer 6.

In the host computer 6 are stored the functions of the air conditioner having one-to-one correspondence to the haptic position numbers. It is supposed that Rec/Fresh, turning on/off, temperature setting, fan speed and defroster of the air conditioner are stored in this embodiment respectively matching haptic position numbers "0", "−1", "−2", "+1" and "+2". In this instance, when the user turns the operating unit 1 counterclockwise to a position where a click feel is sensed twice, the host computer 6 receives haptic position number "−2" transmitted from the controller 7, and selects "temperature setting" out of the air conditioner functions. Then, as the user presses the double action tact switch, which is the second detector 3, just once, the first switch constituting part of the double action tact switch is selectively turned on to alter the tact switch number from "0" to "1". The controller 7 transmits the altered tact switch number "1" to the host computer 6 which, upon receiving this number, finalizes its control mode for "air conditioner temperature setting" and displays the current temperature set in the air conditioner on the display unit 9.

Then, the host computer 6, after transmitting apparatus number "2" and position designation number matching the current temperature, for instance "0", to the controller 7, waits for reception from the controller 7. The controller 7, reading apparatus number "2" and an actuator drive signal matching position designation number "0" out of the function/feel library 8, drives the actuator 4 in accordance with the actuator drive signal to return the operating unit 1 to the center position. This causes the operating unit 1 to function as a 15°-step 13-position rotary switch until another apparatus number is transmitted from the host computer 6. After that, the controller 7 reads haptic position number "0" matching position designation number "0" out of the function/feel library 8, and transmits it to the host computer 6 together with tact switch number "0", which indicates that the second detector 3 is off. This causes the host computer 6 to display the range of temperature variable by manipulating the operating unit 1 on the display unit 9.

When the user turns the operating unit 1 in this state, as in the foregoing case, the first detection signal a1 matching the rotation degree of the operating unit 1 is supplied from the first detector 2. The controller 7 reads actuator drive characteristics 11 matching apparatus number "2" out of the function/feel library 8, and drives the actuator 4 in accordance with an actuator drive signal matching the first detection signal a1 supplied from the first detector 2. Since apparatus number "2" provides the feel that is sensed when the 15°-step 13-position rotary switch is manipulated, every time the operating unit 1 is rotated 15 degrees either clockwise or counterclockwise around the center position 0°, a click feel is provided to the operating unit 1. Also the controller 7, as a click feel is provided to the operating unit 1, successively alters the haptic position number from "0" to "−1", "−2", "−3", "−4" "−5" and "−6" or "+1", "+2", "+3", "+4", "+5" and "+6", and transmits these numbers to the host computer 6.

In the host computer 6 are stored the temperature setpoints of the air conditioner having one-to-one correspondence to the haptic position numbers. It is supposed that "16° C.", "17° C.", "18° C.", "19° C.", "20 "C." "21° C.", "22° C.", "23° C.", "24° C.", "25° C." "26° C.", "27° C." and "28° C." are stored in this embodiment respectively matching haptic position numbers "−6", "−5", "−4", "−3", "−2", "−1", "0", "+1 ", "+2", "+3", "+4", "+5" and "+6". In this instance, when the user turns the operating unit 1 counterclockwise to a position where a click feel is sensed four times, the host computer 6 receives haptic position number "−4" transmitted from the controller 7, and selects the air conditioner temperature setting of "26° C. Then, as the user presses twice the double action tact switch, which is the second detector 3, both the first and second switches constituting the double action tact switch are turned on, and the second detection signal a2 is supplied to alter the tact switch number from "0" to "2". The controller 7 transmits the altered tact switch number "2" to the host computer 6 which, upon receiving this number, finalizes the air conditioner temperature setpoint at "26° C.", and displays that set temperature on the display unit 9. This causes the temperature setpoint to be altered to the desired temperature.

After that, the host computer 6 transmits to the controller 7 apparatus number "1" and position designation number "0", the host computer 6 and the multifunctional input device are returned to their respective initial states.

Next will be described the procedure of FM channel selection using the multifunctional input device in this mode of implementing the invention will be described below with reference to FIG. 5.

As stated above, in its initial state, the feet of operating the 15°-step 5-position rotary switch is sensed by turning the operating unit 1, and the desired one out of the electrical apparatuses 5a through 5n connected to the host computer 6 can be selected. Further in this example of multifunctional input device, as a navigation system, air conditioner, AM/FM tuner, CD/MD player and audio amplifier are stored in the host computer 6 matching haptic position numbers "0", "−1", "−2", "+1" and "+2" supplied from the controller 7, when the user turns the operating unit 1 counterclockwise to a position where a click feel is sensed twice and presses once the double action tact switch, which is the second detector 3, the AM/FM tuner is selected, and the AM/FM tuner is displayed on the display unit 9.

After displaying the AM/FM tuner on the display unit 9, the host computer 6 transmits to the controller 7 apparatus number "3", and position designation number "0", and waits for reception from the controller 7. The controller 7 reads apparatus number "3" and an actuator drive signal matching position designation number "0" out of the function/feel library 8, drives the actuator 4 in accordance with the actuator drive signal to return the operating unit 1 to the center position.

When the user turns the operating unit 1 in this state, the first detection signal a1 matching the rotation degree of the operating unit 1 is supplied from the first detector 2, and the controller 7 drives the actuator 4 in accordance with an actuator drive signal matching the first detection signal a1. As described above, since apparatus number "3," is to provide the operating unit 1 with the feel that is sensed when the 15°-step 3-position rotary switch is manipulated, as the operating unit 1 is turned by 15 degrees either clockwise or counterclockwise around the center position 0°, a click feel is provided to the operating unit 1, and the haptic position number is altered from "0" to "−1" or "+1". The controller 7 transmits the altered haptic position number to the host computer 6.

In the host computer 6 are stored the functions of the AM/FM tuner having one-to-one correspondence to the haptic position numbers of the 15°-step 3-position rotary switch. It is supposed that AM search, preset channel selection and FM search, for instance, are stored in this embodiment respectively matching haptic position numbers "0", 1−1" and "+1". In this instance, when the user turns the operating unit 1 counterclockwise to a position where a click feel is sensed only once, the host computer 6 receives haptic position number "+1" transmitted from the controller 7, and selects "FM search" out of the AM/FM tuner functions.

Then, as the user presses the double action tact switch, which is the second detector 3, just once, the first switch constituting part of the double action tact switch is selectively turned on, and tact switch number is altered from "0" to "1". The controller 7 transmits the altered tact switch number "1" to the host computer 6 which, upon receiving this number, finalizes its control mode for "FM search" and displays available FM channels on the display unit 9.

Then the host computer 6, after transmitting apparatus number "4" and position designation number "0" to the controller 7, waits for reception from the controller 7. The controller 7 reads apparatus number "4" and an actuator drive signal matching position designation number "0" out of the function/feel library 8, and drives the actuator 4 in accordance with the actuator drive signal to set the operating unit 1 in the center position. This causes the operating unit 1 to function as the 30°-step 2-position rotary switch with center-returning capability until another apparatus number is transmitted from the host computer 6. After that, the controller 7 reads haptic position number "0" matching position designation number "0" out of the function/feel library 8, and transmits it to the host computer 6 together with tact switch number "0", which indicates that the second detector 3 is off. This causes the host computer 6 to judge that the multifunctional input device has entered into an FM channel selection mode.

When the user turns the operating unit 1 in this state, the first detection signal a1 matching the rotation degree of the operating unit 1 is supplied from the first detector 2. The controller 7 reads actuator drive characteristics 11 matching apparatus number "4" out of the function/feel library 8, and drives the actuator 4 in accordance with an actuator drive signal matching the first detection signal a1 supplied from the first detector 2. Since apparatus number "4" provides the operating unit 1 with the feel that is sensed when the 30°-step 2-position rotary switch with center-returning capability is manipulated, while the operating unit 1 is rotated 30 degrees either clockwise or counterclockwise around the center position 0°, a click feel matching its rotation degree is provided to the operating unit 1. Also the controller 7, when the operating unit 1 is rotated either clockwise or counterclockwise around the center position, alters the haptic position number from "0" to "−1" or "+1", and transmits this number to the host computer 6.

In the host computer 6 are stored channel search modes having one-to-one correspondence to the haptic position numbers. It is supposed that "channel search in the decreasing order of frequency", "neutral point" and "channel search in the increasing order of frequency", for instance, are stored in this embodiment respectively matching haptic position numbers "0", "−1" and "+1". In this instance, when the user turns the operating unit 1 clockwise or counterclockwise, the host computer 6 receives haptic position number "−1" or "+1" transmitted from the controller 7, and starts channel search either toward a lower or higher frequency. Every time an FM channel is tuned to, the host computer 6 once stops the search, and resets the neutral point of the operating unit 1 to that frequency. Thereafter, the turning of the operating unit 1 is repeated in the same way until the desired FM channel is selected.

When the user presses twice the double action tact switch, which is the second detector 3, after the desired FM channel is selected, both the first and second switches constituting the double action tact switch are turned on to supply the second detection signal a2, and the tact switch number is altered from "0" to "2". The controller 7 transmits the altered tact switch number "2" to the host computer 6 which, receiving this number, finalizes the tuning of the AM/FM tuner to the selected FM channel, and displays that finalized tuning on the display unit 9. This causes the temperature setpoint to be altered to the desired temperature.

After that, the host computer 6 transmits apparatus number "1" and position designation number "0" to the controller 7, and the host computer 6 and the multifunctional input device are returned to their respective initial states.

Next will be described the procedure of audio volume control using the multifunctional input device in this mode of implementing the invention with reference to FIG. 6.

As stated above, in its initial state, the feel of operating the 15°-step 5-position rotary switch is sensed by turning the operating unit 1, and the desired one out of the electrical apparatuses 5a through 5n connected to the host computer 6 can be selected. Further in this example of multifunctional input device, as a navigation system, air conditioner, AM/FM tuner, CD/MD player and audio amplifier are stored in the host computer 6 matching haptic position numbers "0", "−1", "−2", "+1" and "+2" supplied from the controller 7, when the user turns the operating unit 1 clockwise to a position where a click feel is sensed twice and presses once the double action tact switch, which is the second detector 3, the audio amplifier is selected, and the audio amplifier is displayed on the display unit 9.

After displaying the audio amplifier on the display unit 9, the host computer 6 transmits apparatus number "5" and position designation number "−1" to the controller 7, and waits for reception from the controller 7. The controller 7 reads apparatus number "5" and an actuator drive signal matching position designation number "−1" out of the function/feel library 8, and drives the actuator 4 in accordance with the actuator drive signal to return the operating unit 1 to its prescribed position.

When the user turns the operating unit 1 in this state, the first detection signal a1 matching the rotation degree of the operating unit 1 is supplied from the first detector 2, and the controller 7 drives the actuator 4 in accordance with an actuator drive signal matching the first detection signal a1. As described above, since apparatus number "5" is to provide the operating unit 1 with the feel that is sensed when the 30°-step 4-position rotary switch is manipulated, every time the operating unit 1 is turned 30 degrees either clockwise or counterclockwise beyond the center position 0°, a click feel is provided to the operating unit 1, and the haptic position number is successively altered from "0" to "−2 or +1" and "+2". The controller 7 transmits the altered haptic position number to the host computer 6.

In the host computer 6 are stored the functions of the audio amplifier having one-to-one correspondence to the respective haptic position numbers of the 30°-step 4-position rotary switch. It is supposed that volume, bass, treble and fader, for instance, are stored in this embodiment respectively matching haptic position numbers "−2", "−1", "+1" and "+2". In this instance, when the user turns the operating unit 1 counterclockwise until a click feel is sense once, the host computer 6 receives haptic position number "−2" transmitted from the controller 7, and selects "volume" out of the functions of the audio amplifier. Then, as the user presses the double action tact switch, which is the second detector 3, just once, the first switch constituting part of the double action tact switch is selectively turned on, and tact switch number is altered from "0" to "1". The controller 7 transmits the altered tact switch number "1" to the host computer 6 which, upon receiving this number, finalizes its control mode for "volume" and displays the volume on the display unit 9.

Then the host computer 6, after transmitting apparatus number "6" and position designation number "20" to the controller 7, waits for reception from the controller 7. The controller 7 reads apparatus number "6" and an actuator drive signal matching position designation number "20" out of the function/feel library 8, drives the actuator 4 in accordance with the actuator drive signal, and sets the operating unit 1 in a position where the audio volume is 20%. This causes the operating unit 1 to function as a 180° variable resistor until another apparatus number is transmitted from the host computer 6. After that, the controller 7 reads haptic position "20" matching position designation number "20" out of the function/feel library 8, and transmits it to the host computer 6 together with tact switch number "0", which indicates that the second detector 3 is off. This causes the host computer 6 to judge that the multifunctional input device has entered into an audio volume control mode.

When the user turns the operating unit 1 in this state, the first detection signal a1 matching the rotation degree of the operating unit 1 is supplied from the first detector 2. The controller 7 reads actuator drive characteristics 11 matching apparatus number "6" out of the function/feel library 8, and drives the actuator 4 in accordance with an actuator drive signal matching the first detection signal a1 supplied from the first detector 2. Since apparatus number "6" provides the operating unit 1 with the feel that is sensed when the 180° variable resistor is manipulated, while the operating unit 1 is rotated either clockwise or counterclockwise within its movable range, oscillation of a fixed intensity is provided to the operating unit 1. Also the controller 7, when the operating unit 1 is rotated, alters the haptic position number from "20" to a post-rotation value, for instance "25", and transmits this number to the host computer 6.

In the host computer 6 is stored volume data having one-to-one correspondence to the haptic position numbers. This volume data is so set that the numerical value of haptic position number be the same as the percentage representing the volume: for instance, a volume of 20% matches haptic position number "20" and one of 25% matches haptic position number "25". Accordingly, when the operating unit 1 is rotated either clockwise or counterclockwise, the host computer 6 receives a haptic position number transmitted from the controller 7, and sets the volume level of the audio amplifier to the volume represented by that haptic position number. Thereafter, the turning of the operating unit 1 is repeated in the same way until the desired volume level is obtained.

When the user presses twice the double action tact switch, which is the second detector 3, after the volume is regulated to the desired level, both the first and second switches constituting the double action tact switch are turned on to supply the second detection signal a2, and the tact switch number is altered from "0" to "2". The controller 7 transmits the altered tact switch number "2" to the host computer 6 which, receiving this number, finalizes the volume of the audio amplifier, and displays that finalized volume on the display unit 9. This results in alteration of the audio volume to the desired level.

After that, the host computer 6 transmits apparatus number "1" and position designation number "0" to the controller 7, and the host computer 6 and the multifunctional input device return to their respective initial states.

To add, although the description of the examples of this embodiment of the invention referred only to the temperature regulation of the air conditioner, selection of FM channels and audio volume control using the multifunctional input device in this mode of implementation, the essentials of the invention are not limited to these, and the invention makes possible regulation of any functions of any electrical apparatuses connected to the host computer 6 by similar methods.

Furthermore, although plus and minus signs were attached to position designation numbers and haptic position numbers, the essentials of the invention are not limited to these, and the invention can be applied to assignment of any number information having neither plus nor minus signs.

As hitherto described, since the multifunctional input device according to the invention is provided with a function/feel library in itself, it can be enhanced in self-conclusiveness as compared with a multifunctional input device wherein the host computer is provided with a memory storing the function/feel library, and the load on the host computer can be reduced correspondingly. Also, in the multifunctional input device according to the invention, feel number information and function number information are transmitted and received between the controller and the host computer, with the result that the volume of signals transmitted and received between the controller and the host computer is smaller than where detection signals supplied from the detector and drive signals generated by the host computer are transmitted and received, resulting in a further alleviation of the load on the host computer. Therefore, these advantages make possible easier and faster functional regulation of electrical apparatuses and an increase in the number of functions of electrical apparatuses regulable with a single multifunctional input device.

What is claimed is:

1. A multifunctional input device having an operating unit, a detector that detects an operating state of the operating unit, an actuator that provides an external force to the operating unit, and a first controller that exchanges signals with a second controller, which controls at least one external electrical apparatus, and controls driving of the actuator in accordance with instructions from the second controller, wherein:

the first controller is provided with a function/feel library in which is stored a relation of a plurality of actuator drive characteristics representing variations in an actuator drive signal matching detection signals supplied from the detector, feel number information including numbers specifying combinations of the actuator drive characteristics and the detection signals, and function number information including numbers specifying the detection signals; and wherein the first controller, when the first controller has received the feel number information supplied from the second controller, reads out the actuator drive signal matching the feel number information to control the driving of the actuator or, when the operating unit is manipulated, reads out the function number information matching the detection signal from the function/feel library and transmits the function number information to the second controller to selectively control at least one of the external electrical apparatus(es) via the second controller.

2. The multifunctional input device according to claim 1, wherein the operating unit is manipulable in multiple directions, and wherein a plurality of kinds of detection signals are supplied from the detector according to the manipulated direction of the operating unit.

3. The multifunctional input device according to claim 1, wherein the actuator drive characteristics are manipulative feels that are sensed when a multiple-position changeable rotary switch, a multiple-position changeable rotary switch with a center-returning capability, an encoder with multiple detents or a variable resistor is manually operated.

4. The multifunctional input device according to claim 1, wherein the feel number information contains apparatus numbers, of which one is assigned to each of the actuator drive characteristics, and position designation numbers, of which one is assigned to each operating position of the operating unit in the actuator drive characteristics, and the function number information contains haptic position numbers, of which one is assigned to each operating range of the operating unit and tact switch numbers, of which one is assigned to each operating state of the detector in the actuator drive characteristics.

5. A system for controlling at least one external apparatus, the system comprising the multifunctional input device according to claim 1, a host computer in communication with the multifunctional input device, and the at least one external apparatus.

6. The system according to claim 5, wherein the at least one external apparatus includes a vehicle-mounted electrical apparatus.

7. The system according to claim 6, wherein the vehicle-mounted electrical apparatus includes at least one of an air conditioner, AM/FM tuner, CD/MD player, audio amplifier and navigation system.

8. A vehicle comprising the system according to claim 5 and an engine.

9. The vehicle according to claim 8, wherein the at least one external apparatus includes at least one of: an air conditioner, AM/FM tuner, CD/MD player, audio amplifier and navigation system.

10. A method of alleviating a load on a host computer connected with a multifunctional input device in a vehicle and permitting faster regulation of various functions of a plurality of electrical apparatuses connected with the multifunctional input device, the method comprising:

manipulating an operating unit of the multifunctional input device;

detecting an operating state of the operating unit;

retrieving information from a library;

providing an external force to the operating unit using an actuator; and controlling at least one of the electrical apparatuses and driving the actuator using different controllers and the information from the library, the controllers communicating with each other, wherein only one of the controllers receives the information from the library.

11. The method according to claim 10, wherein a first controller, which receives the information from the library, drives the actuator or transmits the information to a second controller, which selectively controls one of the electrical apparatuses dependent on the information.

12. The method according to claim 11, wherein the first controller transmits the information to the second controller when the operating unit is manipulated.

13. The method according to claim 11, further comprising the second controller supplying information to the first controller, the first controller retrieving the information from the library using the information from the second controller, and the first controller using the information from the library to drive the actuator.

14. The method according to claim 12, further comprising the first controller using information dependent on the operating state to retrieve the information from the library when the operating unit is manipulated, transmitting the information from the library to the second controller, and the second controller using the information from the library to selectively control the at least one of the electrical apparatuses.

15. The method according to claim 10, further comprising retrieving from the library information that includes a relation of a plurality of actuator drive characteristics representing variations in an actuator drive signal matching detection signals dependent on the operating state of the operating unit, feel number information including numbers specifying combinations of the actuator drive characteristics and the detection signals, and function number information including numbers specifying the detection signals.

16. The method according to claim 10, further comprising enumerating each of the electrical apparatuses capable of being controlled and controlling the electrical apparatuses dependent on the electrical apparatus number.

17. The method according to claim 16, further comprising initializing the multifunctional input device when an engine of the vehicle is started by the host computer transmitting information including the electrical apparatus number and a number corresponding to a position of the operating unit to the controllers, the controllers using the information from the host computer to retrieve the information from the library and driving the actuator in accordance with the information from the library, setting the operating unit in a center position, the host computer transmitting new information including another electrical apparatus number to the controllers, the controllers using the new information to retrieve new information from the library and sending the new information to the host computer to regulate the electrical apparatuses to which the host computer is connected.

18. A method of alleviating a load on a host computer connected with a multifunctional input device in a vehicle and permitting faster regulation of various functions of a plurality of electrical apparatuses connected with the multifunctional input device, the method comprising:

manipulating an operating unit of the multifunctional input device;

detecting an operating state of the operating unit;

retrieving information from a library;

providing an external force to the operating unit using an actuator; and controlling at least one of the electrical apparatuses and driving the actuator using different controllers and the information from the library, the controllers communicating with each other;

wherein a first controller, which receives the information from the library, drives the actuator or transmits the information to a second controller, which selectively controls one of the electrical apparatuses dependent on the information.

19. The method according to claim 18, wherein the first controller transmits the information to the second controller when the operating unit is manipulated.

20. The method according to claim 18, further comprising the second controller supplying information to the first controller, the first controller retrieving the information from the library using the information from the second controller, and the first controller using the information from the library to drive the actuator.

21. The method according to claim 19, further comprising the first controller using information dependent on the operating state to retrieve the information from the library when the operating unit is manipulated, transmitting the information from the library to the second controller, and the second controller using the information from the library to selectively control the at least one of the electrical apparatuses.

22. The method according to claim 18, further comprising retrieving from the library information that includes a relation of a plurality of actuator drive characteristics representing variations in an actuator drive signal matching detection signals dependent on the operating state of the operating unit, feel number information including numbers specifying combinations of the actuator drive characteristics and the detection signals, and function number information including numbers specifying the detection signals.

23. The method according to claim 18, further comprising enumerating each of the electrical apparatuses capable of being controlled and controlling the electrical apparatuses dependent on the electrical apparatus number.

24. The method according to claim 23, further comprising initializing the multifunctional input device when an engine of the vehicle is started by the host computer transmitting information including the electrical apparatus number and a number corresponding to a position of the operating unit to the controllers, the controllers using the information from the host computer to retrieve the information from the library and driving the actuator in accordance with the information from the library, setting the operating unit in a center position, the host computer transmitting new information including another electrical apparatus number to the controllers, the controllers using the new information to retrieve new information from the library and sending the new information to the host computer to regulate the electrical apparatuses to which the host computer is connected.

25. A method of alleviating a load on a host computer connected with a multifunctional input device in a vehicle and permitting faster regulation of various functions of a plurality of electrical apparatuses connected with the multifunctional input device, the method comprising:

manipulating an operating unit of the multifunctional input device;

detecting an operating state of the operating unit;

retrieving information from a library;

providing an external force to the operating unit using an actuator;

controlling at least one of the electrical apparatuses and driving the actuator using different controllers and the information from the library, the controllers communicating with each other; and retrieving from the library information that includes a relation of a plurality of actuator drive characteristics representing variations in an actuator drive signal matching detection signals dependent on the operating state of the operating unit, feel number information including numbers specifying combinations of the actuator drive characteristics and the detection signals, and function number information including numbers specifying the detection signals.

26. The method according to claim 25, further comprising enumerating each of the electrical apparatuses capable of being controlled and controlling the electrical apparatuses dependent on the electrical apparatus number.

27. The method according to claim 26, further comprising initializing the multifunctional input device when an engine of the vehicle is started by the host computer transmitting information including the electrical apparatus number and a number corresponding to a position of the operating unit to the controllers, the controllers using the information from the host computer to retrieve the information from the library and driving the actuator in accordance with the information from the library, setting the operating unit in a center position, the host computer transmitting new information including another electrical apparatus number to the controllers, the controllers using the new information to retrieve new information from the library and sending the new information to the host computer to regulate the electrical apparatuses to which the host computer is connected.

28. A method of alleviating a load on a host computer connected with a multifunctional input device in a vehicle and permitting faster regulation of various functions of a plurality of electrical apparatuses connected with the multifunctional input device, the method comprising:

manipulating an operating unit of the multifunctional input device;

detecting an operating state of the operating unit;

retrieving information from a library;

providing an external force to the operating unit using an actuator;

controlling at least one of the electrical apparatuses and driving the actuator using different controllers and the information from the library, the controllers communicating with each other; and enumerating each of the electrical apparatuses capable of being controlled and controlling the electrical apparatuses dependent on the electrical apparatus number.

29. The method according to claim 28, further comprising initializing the multifunctional input device when an engine of the vehicle is started by the host computer transmitting information including the electrical apparatus number and a number corresponding to a position of the operating unit to the controllers, the controllers using the information from the host computer to retrieve the information from the library and driving the actuator in accordance with the information from the library, setting the operating unit in a center position, the host computer transmitting new information including another electrical apparatus number to the controllers, the controllers using the new information to retrieve new information from the library and sending the new information to the host computer to regulate the electrical apparatuses to which the host computer is connected.

30. A multifunctional input device having an operating unit, a detector that detects an operating state of the operating unit, an actuator that provides an external force to the operating unit, and a first controller that exchanges signals with a second controller, which controls at least one external electrical apparatus, and controls driving of the actuator in accordance with instructions from the second controller, wherein:

the first controller is provided with a function/feel library in which is stored a relation of a plurality of actuator drive characteristics representing variations in an actuator drive signal matching detection signals supplied from the detector, feel specifying information assigned to the actuator drive characteristics and the detection signals, and function specifying information assigned to the detection signals; and wherein the first controller, when the first controller has received the feel specifying information supplied from the second controller, reads out the actuator drive signal matching the feel specifying information to control the driving of the actuator or, when the operating unit is manipulated, reads out the function specifying information matching the detection signal from the function/feel library and transmits the function specifying information to the second controller to selectively control at least one of the external electrical apparatus(es) via the second controller.

31. The multifunctional input device according to claim 30, wherein the operating unit is manipulable in multiple directions, and wherein a plurality of kinds of detection signals are supplied from the detector according to the manipulated direction of the operating unit.

32. The multifunctional input device according to claim 30, wherein the actuator drive characteristics are manipulative feels that are sensed when a multiple-position changeable rotary switch, a multiple-position changeable rotary switch with a center-returning capability, an encoder with multiple detents or a variable resistor is manually operated.

33. The multifunctional input device according to claim 30, wherein the feel specifying information contains apparatus numbers, of which one is assigned to each of the actuator drive characteristics, and position designation numbers, of which one is assigned to each operating position of the operating unit in the actuator drive characteristics, and the function specifying information contains haptic position numbers, of which one is assigned to each operating range of the operating unit and tact switch numbers, of which one is assigned to each operating state of the detector in the actuator drive characteristics.

34. A system for controlling at least one external apparatus, the system comprising the multifunctional input device according to claim 30, a host computer in communication with the multifunctional input device, and the at least one external apparatus.

35. The system according to claim 34, wherein the at least one external apparatus includes a vehicle-mounted electrical apparatus.

36. The system according to claim 35, wherein the vehicle-mounted apparatus includes at least one of an air conditioner, AM/FM tuner, CD/MD player, audio amplifier and navigation system.

37. A vehicle comprising the system according to claim 34 and an engine.

38. The vehicle according to claim 37, wherein the at least one external apparatus includes at least one of: an air conditioner, AM/FM tuner, CD/MD player, audio amplifier and navigation system.

* * * * *